United States Patent [19]

Weingarten

[11] Patent Number: 4,862,914
[45] Date of Patent: Sep. 5, 1989

[54] MULTI-POSITION VALVE FOR BACKFLUSHING FILTERS

[75] Inventor: Zvi Weingarten, Kibbutz Evron, Israel

[73] Assignee: Bermad, Kibbutz Evron, Israel

[21] Appl. No.: 219,497

[22] Filed: Jul. 14, 1988

[30] Foreign Application Priority Data

Mar. 11, 1988 [IL] Israel .......................... 85699

[51] Int. Cl.$^4$ ............................................. F16K 1/00
[52] U.S. Cl. .................................. 137/544; 137/872; 210/424
[58] Field of Search ................. 210/424; 137/866, 869, 137/872, 544; 251/61.2, 30.02, 121, 205

[56] References Cited

U.S. PATENT DOCUMENTS

| | | | |
|---|---|---|---|
| 668,782 | 2/1901 | Torrance | 137/866 |
| 937,828 | 10/1909 | Little | 251/205 |
| 3,028,878 | 4/1962 | Natho | 137/869 |
| 3,033,323 | 5/1962 | Manna | 251/121 |
| 3,767,159 | 10/1973 | Treul | 251/61.2 |

FOREIGN PATENT DOCUMENTS

| | | | |
|---|---|---|---|
| 1650576 | 12/1970 | Fed. Rep. of Germany | 137/872 |
| 569834 | 4/1924 | France | 137/872 |

Primary Examiner—A. Michael Chambers
Attorney, Agent, or Firm—Benjamin J. Barish

[57] ABSTRACT

A valve comprises a housing having an inlet port, an outlet port, and a backflush port for discharging the dirt from the filter during a backflushing operation. A first passageway interconnects the inlet port and outlet port, and a second passageway interconnects the outlet port and the backflush port. A displaceable valve member is movable to a filtering position to effect a filtering operation wherein the inlet port is connected to the outlet port via the first passageway, or to a backflushing position to effect a backflushing operation wherein the outlet port is connected to the backflush port via the second passageway.

5 Claims, 3 Drawing Sheets

MULTI-POSITION VALVE FOR BACKFLUSHING FILTERS

BACKGROUND OF THE INVENTION

The present invention relates to a multiposition valve for use in fluid lines containing filters in order to backflush the filter. Such valves are widely used in water irrigation systems having filters for removing solid particles from the water, which filters are periodically cleaned by a backflushing operation.

The presently available backflush valves usually include a housing having an inlet port connectable to the inlet line supplying the pressurised fluid (e.g., water), an outlet port connectable to the outlet line containing the filter, and a backflush port for discharging the dirt from the filter during a backflushing operation. Such valves also include a first passageway interconnecting the inlet port and the outlet port, a second passageway interconnecting the outlet port and the backflush port, and a displaceable valve member movable either to a filtering position to effect a filtering operation wherein the inlet port is connected to the outlet port via the first passageway, or to a backflushing position to effect a backflushing operation wherein the outlet port is connected to the backflush port via the second passageway.

A main disadvantage of the presently available backflush valves, however, is that they waste considerable quantities of clean water through the backflush port. Thus, they normally operate by first connecting the backflush port to the outlet port, and then disconnect the inlet port from the backflush port.

An object of the present invention is to provide a backflush valve having advantages in the above respects.

BRIEF SUMMARY OF THE INVENTION

According to the present invention, there is provided a valve of the aforegoing type characterized in that the valve member includes surfaces movable with respect to the passageways effective when the valve member moves from its filtering position wherein the first passageway is open and the second passageway is closed, to the backflushing position wherein the first passageway is closed and the second passageway is open, to maintain the second passageway closed until the first passageway is closed, and then to open the second passageway; and when the valve member moves from its backflushing position wherein the first passageway is closed and the second passageway is open, to the filtering position wherein the first passageway is open and the second passageway is closed, to maintain the first passageway closed until the second passageway is closed, and then to open the first passageway.

It will thus be seen that a valve constructed in accordance with the aforegoing features eliminates or substantially decreases the waste of clean water during a backflushing operation. Another advantage, as will be most particularly described below, is that when the valve is actuated from the backflushing mode to the filtering mode, the inlet port is opened positively and completely to its limit even under low inlet pressure.

In the described preferred embodiment, the first passageway includes a first circular opening, and the second passageway includes a second circular opening having a throat whose mouth is coaxial with and faces the first circular opening. A sealing ring is carried at the end of the valve member facing the second circular opening. The second circular opening is of smaller diameter than the first circular opening but its throat is of the same diameter as the first circular opening. The valve member is of the same diameter as the first circular opening and the throat of the second circular opening, and has a length less than the distance between the first and second circular openings, but greater than the distance between the first circular opening and the mouth of the throat of the second circular opening.

Thus, when the valve member moves from its filtering position wherein the first passageway is open and the second passageway is closed, to the backflushing position wherein the first passageway is closed and the second passageway is open, the valve member within the mouth of the throat maintains the second passageway closed until the first passageway is closed, and then opens the second passageway. On the other hand, when the valve member moves from its backflushing position wherein the first passageway is closed and the second passageway is open, to the filtering position wherein the first passageway is open and the second passageway is closed, the valve member maintains the first passageway closed until the second passageway is closed by the valve member reaching and entering the throat of the second passageway, and then opens the first passageway.

In a second described embodiment, the length of the cylindrical valve member is greater than the distance between the openings of the first and second passageways. In this embodiment, the end of the cylindrical valve member facing the second passageway is formed on its outer surface with recesses establishing communication between the outlet port and the backflush port via the second passageway in the backflushing position of the valve member.

The novel backflush valve may be controlled by the application of a fluid pressure from a hydraulic device to a control chamber, e.g., automatically in response to the pressure drop across the filter as sensed by a sensor, or manually. The valve may also be controlled manually by a rotary handle. In either embodiment, the displaceable valve member may also be moved to a third, shut-off position, shutting-off the inlet port from the outlet port and also the backflush port from the outlet port.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
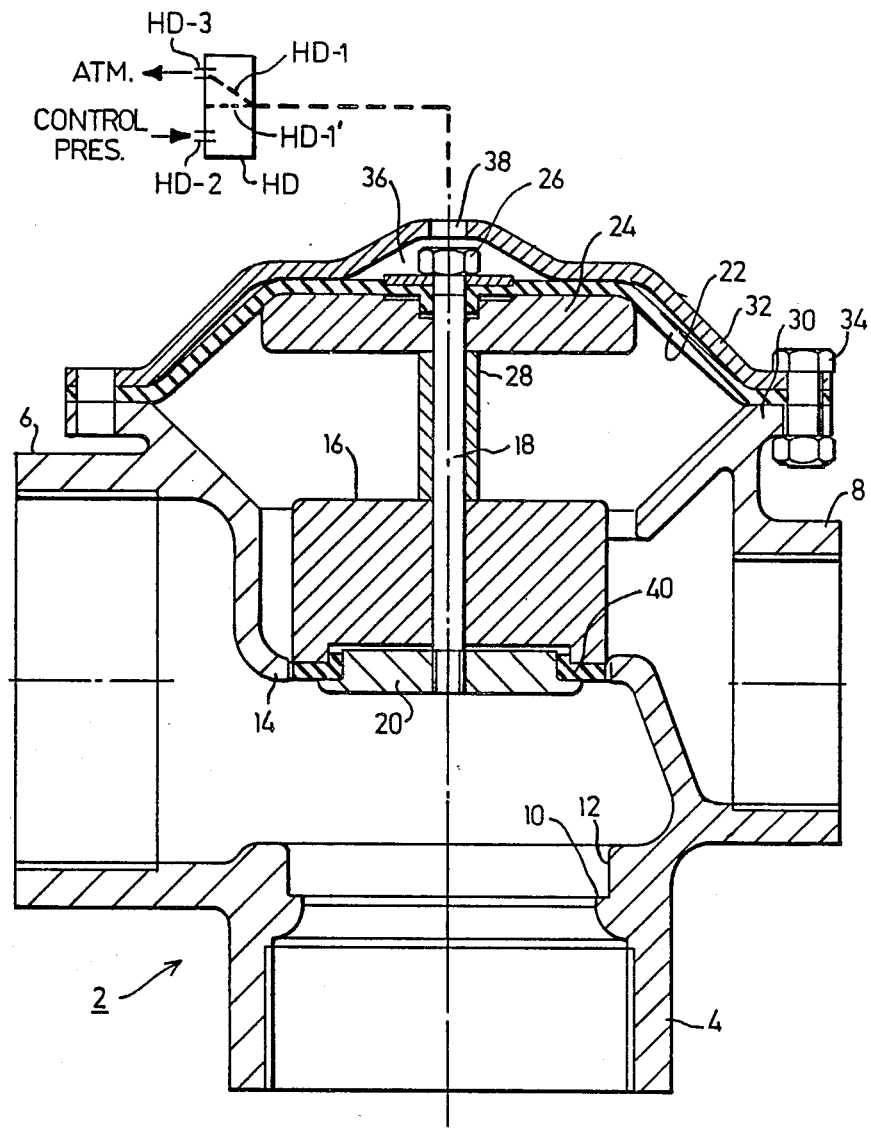
FIG. 1 is a cross-sectional view illustrating one form of backflush valve constructed in accordance with the invention, the valve being shown in its filtering position for effecting a filtering operation.
Figure 2:
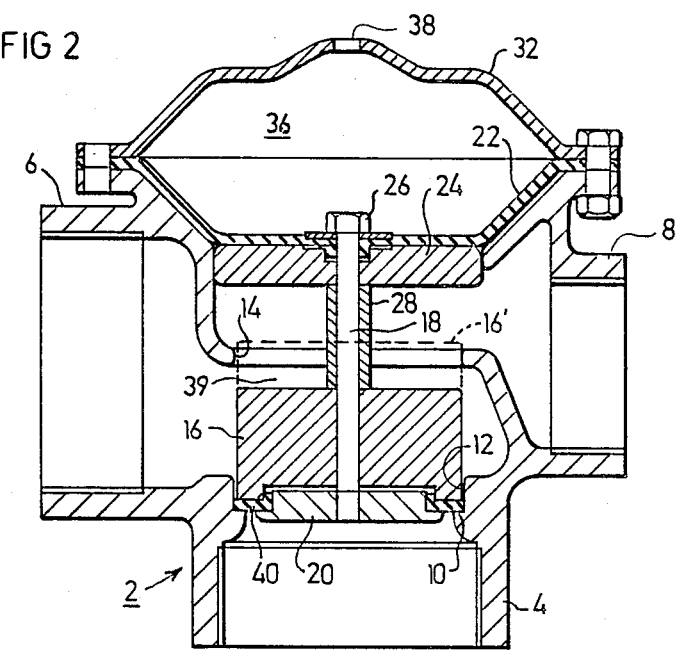
FIG. 2 illustrates the valve of FIG. 1 but with the valve member in its backflushing position to effect a backflushing operation.

The backflush valve illustrated in FIGS. 1 and 2 is particularly useful for water irrigation systems including a filter for removing dirt particles from the water before applied to the water sprinklers or other irrigation devices. FIG. 1 illustrates the valve in its filtering position to effect a filtering operation wherein the inletted water is supplied to the line containing the filter, whereas FIG. 2 illustrates the valve in its backflushing position to effect a backflushing operation wherein the pressurised line containing the filter is connected to a backflush port for backflushing water through the filter in order to clean it. For purposes of example, FIG. 1 illustrates the filter as being actuated by a hydraulic device HD in the form of a 3-way pilot valve, which may be controlled automatically in response to the pressure drop across the filter (not shown), or manually, as known in backflush valves of this type.

The backflush valve illustrated in FIGS. 1 and 2 comprises a housing, generally designated 2, having an inlet port 4 connectable to the inlet line, an outlet port 6 connectable to the outlet line containing the filter, and a backflush port 8 through which the dirty water is discharged during the backflushing operation. Housing 2 further includes a circular opening serving as an inlet seat 10 circumscribed by an inlet throat 12, defining a first passageway interconnecting the inlet port 4 with the outlet port 6. Housing 2 further includes a circular opening serving as a backflush seat 14 defining a second passageway interconnecting the outlet port 6 with the backflush port 8.

A valve member 16 is displaceable within housing 2 and is movable with respect to the inlet seat 10 and the backflush seat 14 in order to effect either a filtering operation (FIG. 1), or a backflushing operation (FIG. 2), according to the position of the valve member. The valve member may also be moved to a third, shut-off position, schematically shown by the broken lines 16' in FIG. 2.

Valve member 16 is carried at one end of a stem 18 passing through the valve member and secured to it by a washer 20. The opposite end of stem 18 is secured to the center of a diaphragm 22 by means of a disc 24 and nut 26 clamping the diaphragm between them. A spacer sleeve 28 encloses stem 18 between disc 24 and valve member 16.

The outer circumference of diaphragm 22 is clamped between an annular flange 30 formed in housing 2 and a cover plate 32 by means of bolts 34. The space between diaphragm 22 and cover plate 32 defines a control chamber 36 connected to the hydraulic device HD via a control port 38 for controlling the pressure within the chamber, and thereby the position of valve member 16. Hydraulic device HD is a 3-way pilot valve and includes a displaceable member HD-1, such as a piston or diaphragm, movable to connect control port 38 (1)to a source of hydraulic pressure HD-2, (2) to a vent HD-3, or (3) to an intermediate position, as shown by the broken lines HD-1'. As indicated earlier, hydraulic device HD may be actuated automatically, (e.g., in response to a predetermined drop of pressure across the filter in the line), or manually.

Valve member 16 is of cylindrical configuration. Valve seat 10 and backflush seat 14 both of circular configuration, are coaxial with the valve member and of substantially the same diameter. As can be seen particularly in FIG. 2, the length of valve member 16 is less than the distance between the two seats 10 and 14, so that when the valve member is seated in the inlet seat 10, there is a substantial space 39 between the opposite face of the valve member and the backwash seat 14, thereby opening the passageway connecting the backwash port 8 with the outlet port 6 to the filter. However, the length of valve member 16 is greater than the distance between seat 14 and the mouth of throat 12 of seat 10, so that the valve member does not clear throat 12 to open seat 10 until it has been received within seat 14. A sealing ring 40 clamped between valve member 16 and washer 20 is seatable in backflush seat 14 during the filtering mode of operation (FIG. 1), and in the inlet seat 10 during the backflushing mode of operation (FIG. 2).

The valve of FIGS. 1 and 2 operates as follows:

FIG. 1 illustrates the valve during the filtering mode of operation, wherein sealing ring 40 of valve member 16 is seated in the backflush seat 14. Accordingly, during the filtering mode of operation, inlet port 4 is connected to the outlet port 6 so that the pressurized water applied through the inlet port is directed by the valve, via outlet port 6, to the outlet line containing the filter, (not shown) whereas the backflush port 8 is shut-off by valve member 16 from the outlet port 6 as well as from the inlet port 4. In this condition of the valve, the displaceable member HD-1 of the 3-way pilot valve HD connects the control port 38 of control chamber 36 to the vent HD-3, so that the inlet pressure maintains valve member 16 in its fully open condition as illustrated in FIG. 1.

A backwashing operation is initiated by moving the movable member HD-1 of hydraulic device HD to connect control port 38 to a source of pressurized fluid, such as the downstream side of the filter, via port HD-2. As indicated earlier, this may be done automatically by a sensor, sensing the pressure drop across the filter, or manually, by a manually movable member. When this occurs, control chamber 36 becomes pressurized sufficiently to overcome the inlet pressure applied to valve member 16, thereby causing the valve member to start to move downwardly towards the backflushing position illustrated in FIG. 2.

During the initial movement of valve member 16, its sealing ring 40 unseats from backflush seat 14, but the outer surface of the cylindrical valve member 16 being of the same diameter as that of the backflush seat, maintains backflush seat 14 still closed with respect to both the inlet port 4 and the outlet port 6, and prevents flow of water from either port to the backflush port 8. Although the outer surface of valve member 16 does not form a perfect seal with backflush port 14, the leakage if any would not be significant until the complete length of the valve member 16 has passed through backflush seat 14. This occurs just as sealing ring 40 reaches and is received within the mouth of throat 12 of the inlet seat 10. At this instant, the opposite end of valve member 16 completes its passage through backflush seat 14 and continues to move away from that seat until sealing ring 40 seats against the inlet seat 10 as shown in FIG. 2.

It will thus be seen that the passageway through backflush seat 14 interconnecting the outlet port 6 with the backflush port 8 does not start to open until valve member 16 has closed the inlet port 4 by first engaging throat 12. Accordingly, no flow will be produced through the backflush port 8 until the inlet port 4 has been completely closed, so that the flow through the backflush port 8 will be only that from the filter line connected to the outlet port 6. Thus, no clean water from the inlet port 4 will be wasted through the backflush port during the change-over to the backflushing mode of operation wherein the filter connected to the outlet port is backflushed via the outlet port 6 and the backflush port 8.

When the backflushing operation has been completed, the displaceable member HD-1 of the 3-way pilot valve HD is moved (automatically or manually) to connect the control port 38 to the venting port HD-3 (the position shown in FIG. 1), whereupon the pressure within control chamber 36 will be vented to the atmosphere. The inlet pressure at the inlet port 4 will then be applied to valve member 16 and will positively move the valve member away from the inlet seat 10 towards the backflush seat 14.

During the initial movement of the valve member, its sealing ring 40 still engages throat 12 of inlet port 10 so as to maintain the inlet port closed until the opposite (upper) end of valve member 16 reaches the backflush seat 14 to close the backflush port 8. Only after the backflush port has thus been closed will valve member sealing ring 40 start to move away from throat 12 to open the inlet port 14. The valve member continues to move until its sealing ring 40 seats within backflush seat 14, as shown in FIG. 1, thereby completing the transition to the filtering mode of operation.

It will thus be seen that during this transition of the valve from the backflush to the filtering mode of operation, the inlet port 4 remains closed until the backflush port 8 is closed by the outer cylindrical surface of valve member 16 being received within the backflush port 14. Thus, also here there is no significant wastage of clean water from the inlet port 4 through the backflush port 8 during the transition from the backflushing mode of operation to the filtering mode of operation. In addition, since this transition is effected directly by the inlet pressure, and without overcoming a spring, the valve member 16 is moved positively to its fully open position with respect to the inlet port 4 and is maintained in its fully open position, even under low inlet pressures.

Valve member 16 may also be moved to an intermediate position, shown by broken lines 16' in FIG. 2, to shut-off the flow both from the inlet port 4 and the outlet port 6. This may be done by moving control member HD-1 of the 3-way pilot valve HD to the intermediate broken-line position HD-1' when the valve member 16 has moved to its intermediate position 16', wherein one end of the valve member closes backflush seat 14, and sealing ring 40 at the other end of the valve member engages the outer end of the inlet throat 12.

Figure 3:
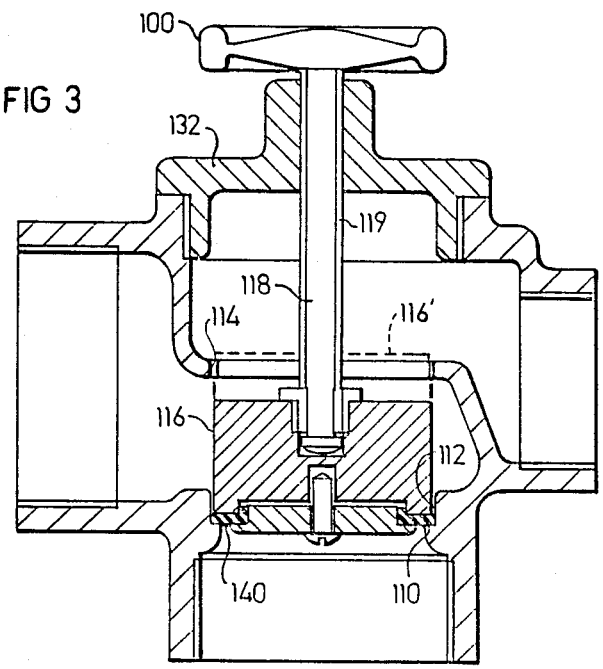
FIG. 3 illustrates the valve of FIGS. 1 and 2 but provided with a rotary handle for manually controlling the valve.

FIG. 3 illustrates a modification in the construction of the valve of FIGS. 1 and 2 for operation by a rotary control handle, generally designated 100, rather than by a hydraulic device, such as shown at HD in FIG. 1. For this purpose, the valve illustrated in FIG. 3 does not include a control chamber, diaphragm or space sleeve, corresponding to elements 36 in FIGS. 1 and 2, nor a diaphragm, corresponding to diaphragm 22, nor a spacer sleeve corresponding to sleeve 28. Instead, the manually-rotatable 100 is fixed to the outer end of stem 118, and the stem is formed with external threads 119 received within an inernally threaded bore formed in cover plate 132. By rotation of handle 100 the valve member 116 may thus be moved: (1) to its filtering position, wherein its sealing ring 140 seats within the backflush seat 114 to effect the filtering mode of operation; (2) to its backflushing position, wherein sealing ring 140 seats within the inlet seat 110 to effect the backflushing mode of operation; or to its shut-off position wherein one end of valve member 116 is within backflush seat 114, and the sealing ring 140 at the opposite end of valve member engages throat 112 of the inlet seat 110. In all other respects, the valve illustrated in FIG. 3 is constructed, and operates in the same manner, as the hydraulically-controlled valve illustrated in FIGS. 1 and 2.

Figure 4:
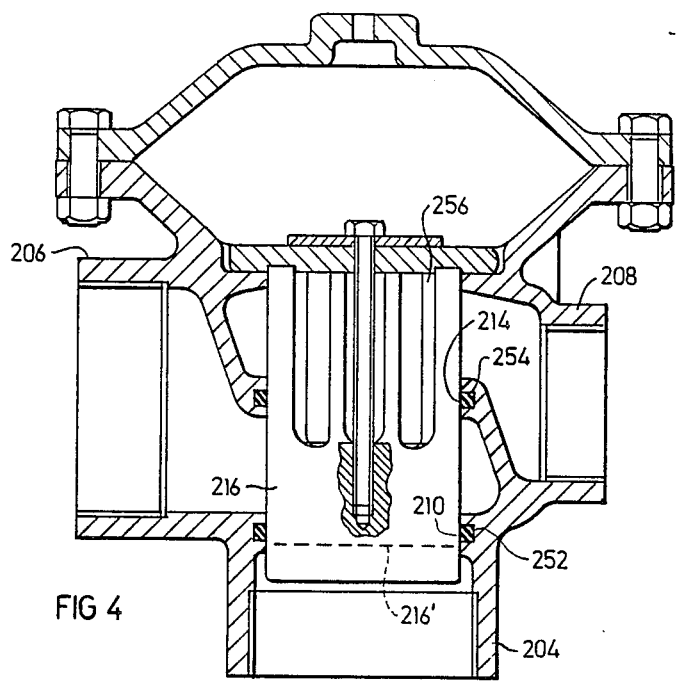
FIG. 4 is a view similar to that of FIG. 2 but illustrating a modification of the valve.

FIG. 4 illustrates a variation in the construction of the hydraulically-controlled valve of FIGS. 1 and 2. In this variation, the valve member, therein designated 216, has a length which is greater than the distance between the inlet seat 210 and the backflush seat 214; in addition, substantialy one-half the valve member, namely the half at the end (upper end) facing the backflush seat 214, is formed with a plurality of longitudinally-extending recesses 256 circumferentially spaced around the valve member circumference.

FIG. 4 illustrates the valve member 216 in its backflushing position, wherein communication is established via recesses between the outlet port 206 (leading to the filter) and the backflush port 208, to produce a backflushing operation.

In the modification illustrated in FIG. 4, the inlet port 204 is not circumscribed by a throat, corresponding to throat 12 in FIGS. 1 and 2. However, the inlet opening 210 and the backflush opening 214 are both provided with circular sealing rings 252, 254. In addition, valve member 216 is of longer length than the distance between the inlet seal 252 and the backflush seal 254. Further, valve member 216 is formed with a plurality of axially-extending, circumferentially-spaced recesses or grooves 256. With these modifications, it will be seen that the valve illustrated in FIG. 4 operates in substantially the same manner as described above with respect to FIGS. 1 and 2.

Thus, during the movement of valve member 216 upwardly from its backflushing position (the lower position illustrated in FIG. 4) to its filtering position, the inlet port 204 will remain closed until the backflushing port 208 has been closed by the movement of the non-recessed part of valve member 216 into the backflush opening 214 into engagement with its seal 254. Also, during the movement of the valve member 216 downwardly from its filtering position to its backflushing position, the inlet port 204 will be closed by the engagement of the lower end of the valve member 216 with the inlet seal 252 before the backflush port 208 is opened via recesses 256 to the outlet port 206. Valve member 216 of FIG. 4 may also be moved to an intermediate position, as shown by the broken lines 216', to shut-off the flow with respect to both the inlet port 204 and the outlet port 206.

The valve illustrated in FIG. 4 will therefore also avoid wastage of clean water via the backflush port 208 during the transition from or to the backflushing position. Also, the valve member will move to its fully-open position positively, even under low inlet pressure, since the full inlet pressure is applied to it.

Figure 5:
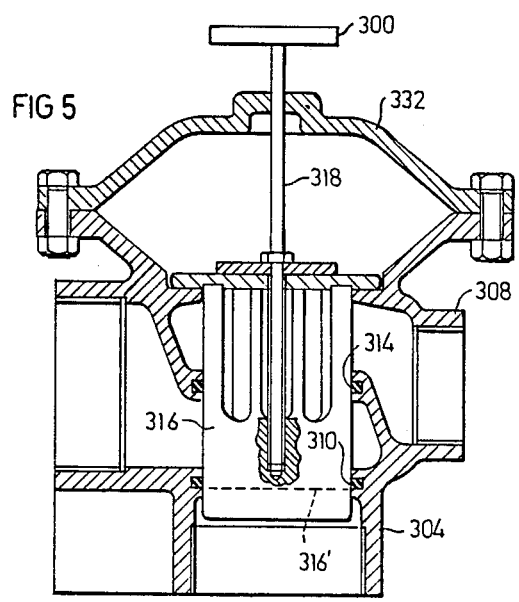
FIG. 5 illustrates the valve of FIG. 4, but provided with a rotary handle for operating the valve, FIG. 5 also illustrating a third position of the valve, to shut-off the flow of the fluid from the inlet port to the outlet port as well as the flow from the outlet port to the backflush port.

FIG. 5 illustrates a backflush valve constructed according to FIG. 4, but equipped with a manually rotatable handle, therein designated 300, corresponding to handle 100 in FIG. 3, for moving the valve member manually to its filtering position or to its backflushing position (the latter illustrated in FIG. 5). In the modification of FIG. 5, handle 300 is fixed to one end of an externally-threaded stem 318 received within an internally-threaded opening formed in the cover plate 332, as described above with respect to FIG. 3 and will therefore operate as the FIG. 3 embodiment. It will also be seen that, as in FIG. 3, handle 300 may be rotated to move valve member 316 to an intermediate, shut-off position 316', wherein its lower face is substantially flush with the inlet seal 252, whereby the non-recessed cylindrical surface of valve member 316 closes both the inlet seat 310 and the backflush seat 314, and thereby shuts-off the flow both through the inlet port 304 and through the backflush port 308.

While the invention has been described with respect to several preferred embodiments, it will be appreciated that many other variations, modifications and applications of the invention may be made.

What is claimed is:

1. A valve connectable between an inlet supply line supplying pressurized fluid, and an outlet line containing a filter for filtering the fluid, said valve comprising:
   a housing having an inlet port connectable to the inlet line, an outlet port connectable to the outlet line, a backflush port for discharging the dirt from the filter during a backflushing operation, a first passageway, including a first circular opening, interconnecting said inlet port and outlet port, a second passageway, including a second circular opening having a throat whose mouth is coaxial with and faces said first circular opening, interconnecting said outlet port and said backflush port, and a cylindrical valve member coaxial with said two circular openings and said throat and movable to at least a filtering position to effect a filtering operation wherein the inlet port is connected to the outlet port via said first passageway, or to a backflushing position to effect a backflushing operation wherein the outlet port is connected to said backflush port via said second passageway; and a sealing ring carried at the end of said valve member facing said second circular opening;
   said second circular opening being of smaller diameter than said first circular opening, but its throat being of the same diameter as said first circular opening;
   said valve member being of the same diameter as said first circular opening and said throat of the second circular opening, and having a length less than the distance between said first and second circular openings, but greater than the distance between said first circular opening and the mouth of the throat of the second circular opening, such that:
   when the valve member moves from its filtering position wherein the first passageway is open and the second passageway is closed, to the backflushing position wherein the first passageway is closed and the second passageway is open, the valve member within said throat maintains the second passageway closed until the first passageway is closed, and then opens the second passageway;
   and when the valve member moves from its backflushing position wherein the first passageway is closed and the second passageway is open, to the filtering position wherein the first passageway is open and the second passageway is closed, the valve member maintains the first passageway closed by said throat until the second passageway is closed by the valve member reaching said first opening, and then opens the first passageway.

2. The valve according to claim 1, wherein the valve member is connected to one end of a stem passing through, and of smaller diameter than, the opening of said second passageway, the opposite end of the stem being connected to a device for displacing the valve member.

3. The valve according to claim 1, wherein the valve member is also movable to a third, shut-off position, intermediate its filtering and backflushing positions, the valve member having one end received within said first circular opening and its opposite end received within the throat of the second circular opening to shut-off said inlet port from the outlet port and also to shut-off the backflush port from the outlet port.

4. The valve according to claim 1, wherein said device for displacing the valve member comprises a diaphragm disposed within a control chamber adapted to be pressurised in order to move the valve member to one of its positions.

5. The valve according to claim 1, wherein said device for displacing the valve member comprises a rotary handle adapted to be manually rotated in order to move the valve member to either its filtering position or to its backflushing position.

* * * * *